United States Patent

[11] 3,602,064

[72] Inventor Philip L. Francis
 Rochester, Mich.
[21] Appl. No. 23,604
[22] Filed Mar. 30, 1970
[45] Patented Aug. 31, 1971
[73] Assignee General Motors Corporation
 Detroit, Mich.

[54] PARKING BRAKE CONTROL
 2 Claims, 4 Drawing Figs.
[52] U.S. Cl..................................................... 74/512,
 74/501.5 R, 74/541
[51] Int. Cl...................................................... G05g 1/14
[50] Field of Search............................................ 74/541,
 540, 542, 512, 501.5 R

[56] References Cited
UNITED STATES PATENTS
3,002,394 10/1961 Spisz.......................... 74/542 X Primary Examiner—Milton Kaufman
Attorneys—W. E. Finken and D. D. McGraw ABSTRACT: A parking brake control mechanism for motor vehicles that maintains braking effort despite relaxation of any of the parking brake system components. A brake lever to which the brake cable is attached is biased in a cable tensioning direction by a torsion spring to provide the antirelaxation mechanism of this invention.

INVENTOR
Philip L. Francis
BY
D. D. McGraw
ATTORNEY

PARKING BRAKE CONTROL

The invention relates to an improved parking brake control. When a parking brake is actuated, the force applied is usually only sufficiently great to prevent the vehicle from moving at the time it is parked. Any changes in parking conditions or relaxation of force exerted through the parking brake system components may allow the vehicle to roll.

The present invention comprises a parking brake lever arrangement in which an actuating brake pedal lever and a ratchet lever are commonly pivoted on a fixed member. A brake cable lever is pivoted intermediate its ends on the ratchet lever with the brake cable attached in tension to one end. The other end of the brake cable lever is positioned between stops on the ratchet lever and engages an arm of the pedal lever. A ratchet pawl permits the ratchet lever to be rotated in a brake cable tensioning direction and locked to hold the cable tension. The ratchet pawl is provided with a suitable release. A torsion spring engages the brake cable lever and the ratchet lever and urges the brake cable lever to pivot in a cable tensioning direction on the ratchet lever. The brake applying movement of the pedal lever loads the torsion spring and also moves the ratchet lever to tension the brake cable. As the brake system tends to relax, the energy stored in the torsion spring keeps the brake cable in brake applying tension.

Figure 1:
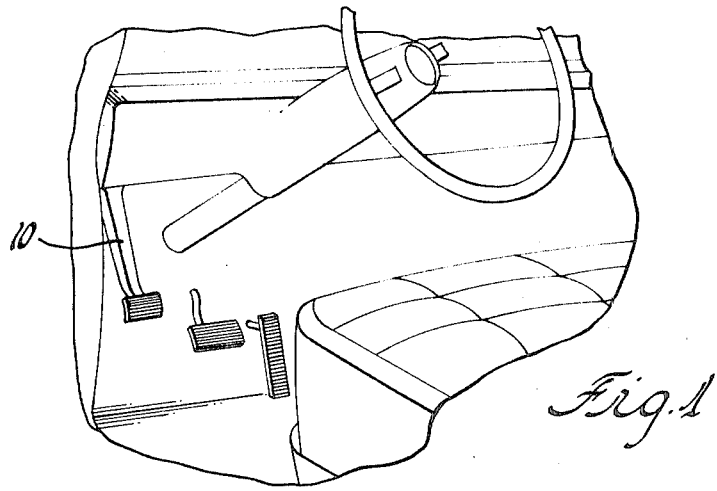
FIG. 1 is a cutaway view of a vehicle showing brake pedal arrangements.
Figure 2:
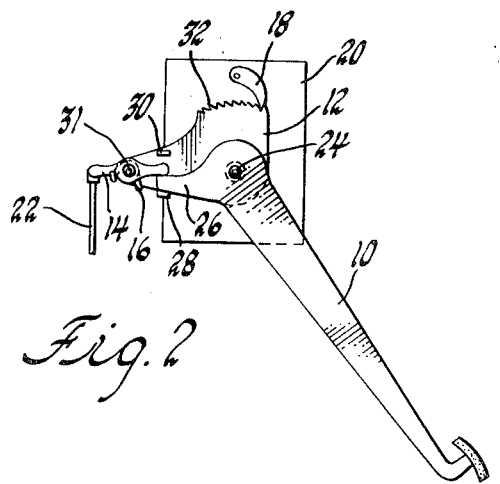
FIG. 2 is an elevation view of the parking brake control mechanism of FIG. 1 shown in the brake "off" position.

Referring to FIGS. 1 and 2, the parking brake control force intensifier mechanism includes an actuating pedal lever 10, a ratchet lever 12, a brake cable lever 14, a torsion spring 16, a ratchet pawl 18, a fixed member 20, and a brake cable 22. The actuating pedal lever 10 and the ratchet lever 12 are commonly pivoted on a pin 24 secured to the fixed member 20. An arm 26 of the actuating pedal lever 10 is rotatable between the stops 28 and 30 of the ratchet lever 12.

The brake cable lever 14 is pivoted intermediate its ends on the pin 31 secured to the ratchet lever 12. The brake cable 22 is pivotally attached to one end of the brake cable lever 14 and the other end of the brake cable lever is positioned between stop 30 of the ratchet lever 12 and arm 26 of the pedal lever 10. The torsion spring 16 engages the brake cable lever 14 and the ratchet lever 12 and urges the brake cable lever 14 to pivot in a cable tensioning direction. The ratchet pawl 18 is pivotally secured to the fixed member 20 and engages ratchet teeth 32 which are formed in an arcuate segment of ratchet lever 12. Release of the pawl 18 from the ratchet teeth 32 is by means of a suitable release mechanism not shown.

OPERATION

FIG. 2 shows the brake control in its normal rest position. The ratchet pawl 18 has been released from the ratchet lever teeth 32, releasing tension from the brake cable 22. The torsion spring 16 forces the brake cable lever 14 into abutting engagement with arm 26 of the brake-actuating pedal lever 10 causing it to abut the stop 28 of the ratchet lever 12.

Figure 3:
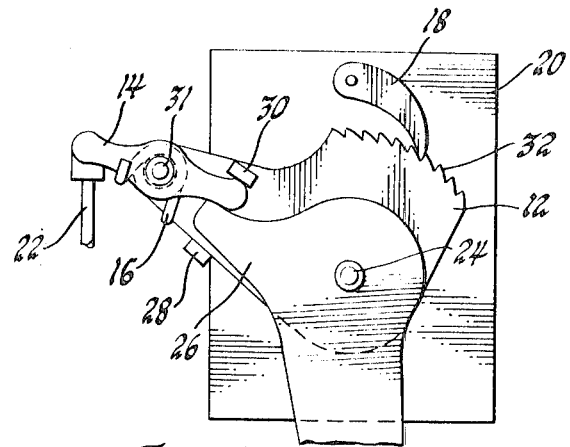
FIG. 3 is an elevation view of the parking brake mechanism of FIG. 1 shown during brake application.

FIG. 3 shows the brake control mechanism during application of braking force to the actuating pedal lever 10. Upon application of force to the actuating pedal lever 10, the actuating pedal lever, the ratchet lever 12 and the brake cable lever 14 rotate about the pivot pin 24 in unitary motion until the tension in the brake cable 22 overcomes the torsion spring 16. Energy is stored in the torsion spring 16 as the actuating pedal lever arm 26 rotates the brake cable lever 14 towards and into abutment with the ratchet lever stop 30. Upon continued brake force application, the brake pedal lever 10, the ratchet lever 12 and the brake cable lever 14 continue to rotate about pin 24 in unitary motion to further tension the brake cable 22. The ratchet pawl 18 engages the teeth 32 of the ratchet lever thereby maintaining the position of the ratchet lever upon termination of the braking force. The torsion spring 16 biases the brake cable lever in the brake tensioning direction to maintain brake cable tension and take up the slack as the brake cable control mechanism and the brakes relax.

Figure 4:
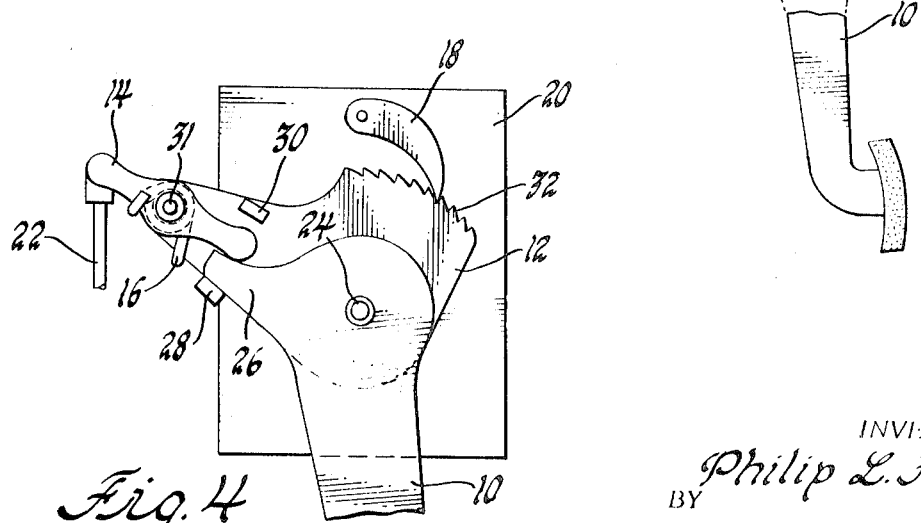
FIG. 4 is an elevation view of the parking brake control mechanism of FIG. 1 shown in the brake "on" position.

In FIG. 4, relaxation of the brake system components has permitted torsion spring 16 to rotate brake cable lever 14 away from the ratchet lever stop 30, thereby maintaining the brake cable 22 in tension to maintain braking effort.

Thus, a parking brake control mechanism is provided which compensates for relaxation of the braking system components.

What is claimed is:

1. A parking brake force intensifier mechanism comprising:
   a fixed member;
   a ratchet lever;
   an actuating lever, said actuating lever and said ratchet lever pivotally mounted on said fixed member by a pivot pin;
   a brake lever pivotally mounted on said ratchet lever;
   a brake cable attached to said brake lever;
   means biasing said brake lever pivotally relative to said ratchet lever and in brake cable tensioning direction and toward pivotal engagement with said actuating lever,
   a pawl pivotally attached to said fixed member and engaging said ratchet lever, thereby maintaining a pivotal position of said ratchet lever against tension force exerted through said brake cable.

2. The parking brake force intensifier mechanism of claim 1 further characterized by:
   said ratchet lever having first and second arcuately spaced stop means attached thereto;
   said actuating lever having an abutment arcuately movable between said stop means, whereby said stop means define limits of rotation of said actuating lever relative to said ratchet lever;
   said brake lever being pivotally attached intermediate its ends by a pivot pin secured to said ratchet lever,
   said brake cable being pivotally attached to one end of said brake lever;
   said biasing means being a torsion spring biasing the other end of said brake lever into pivotal engagement with the abutment of said actuating lever and thereby biasing said actuating lever into engagement with the first stop means on said ratchet lever to define a rest position of the mechanism,
   said pawl being releasable to permit the mechanism to assume a rest position.